United States Patent
Reppel

(10) Patent No.: US 7,322,876 B2
(45) Date of Patent: Jan. 29, 2008

(54) APPARATUS FOR PREPARING A TIRE SURFACE FOR APPLICATION OF A PATCH

(75) Inventor: Emil Willi Reppel, Falkenberg (SE)

(73) Assignee: Michelin Recherche et Technique S.A. (CH)

( * ) Notice: Subject to any disclaimer, the term of this patent is extended or adjusted under 35 U.S.C. 154(b) by 0 days.

(21) Appl. No.: 11/390,572

(22) Filed: Mar. 28, 2006

(65) Prior Publication Data

US 2007/0232195 A1    Oct. 4, 2007

(51) Int. Cl.
*B24B 49/00* (2006.01)
(52) U.S. Cl. .................. 451/11; 451/414; 451/231
(58) Field of Classification Search .................. 451/11, 451/231, 232, 236, 243, 244, 278–280, 360–362, 451/405, 414, 27; 157/13, 20
See application file for complete search history.

(56) References Cited

U.S. PATENT DOCUMENTS

| | | | |
|---|---|---|---|
| 4,041,652 A * | 8/1977 | Graven et al. ............. 451/415 |
| 4,586,551 A * | 5/1986 | Collins ....................... 157/1.24 |
| 4,846,239 A * | 7/1989 | Heller et al. ................. 157/1.3 |
| 6,179,032 B1 * | 1/2001 | Diez ............................ 157/1.1 |

FOREIGN PATENT DOCUMENTS

EP    1604809 A1    12/2005

* cited by examiner

*Primary Examiner*—Dung Van Nguyen
(74) *Attorney, Agent, or Firm*—Dority & Manning, P.A.

(57) ABSTRACT

An apparatus is provided for use in preparing the inner surface of a tire for the application of a patch so that, for example, the tire may be equipped with various electronic devices. The apparatus facilitates improved operation of a grinder or buffer so that the grinding depth and surface area prepared for patch application can be more precisely controlled. Adjustment for different tires sizes and models is provided.

20 Claims, 5 Drawing Sheets

APPARATUS FOR PREPARING A TIRE SURFACE FOR APPLICATION OF A PATCH

FIELD OF THE INVENTION

The present invention relates to an apparatus for use in preparing the inner surface of a tire for the application of a patch so that, for example, the tire may be equipped with various electronic devices. More specifically, the present invention provides an apparatus for improved operation of a grinder or buffer and allows the grinding depth and surface area treated for patch application to be more precisely controlled. Adjustment for different tires sizes and models can also be provided.

BACKGROUND OF THE INVENTION

Tires are frequently being equipped with various electronic devices for transmitting data. These devices may include RFIDs, sensors, or other electronics for conveying important information about the tire and its operating conditions. In order to transmit information, such electronic device will typically include at least one antenna.

Various methods for coupling an electronic device with a tire are available. While electronic devices may be configured about the structure of the tire, affixing the electronic device to the inner surface of the tire near the end of the manufacturing process may be preferable due to the stresses generated in the tire during, for example, molding operations. In such case, the desired electronics may be added through means of a patch applied to the inner surface of the tire after molding or at some other desirable point during manufacture. Alternatively, the patch may be applied to the inner surface after manufacture by a subsequent purchaser such as a distributor or fleet operator. By way of example, a fleet operator may wish to add an electronic device that was not provided with the tire originally.

In general, the inner surface of the pneumatic tire consists of a thin, gas impermeable inner liner or membrane. This inner liner is typically covered with one or more non-stick materials or residue. To obtain adhesion between the patch and the inner surface of the tire, these non-stick materials should be removed from the specific surface area where the patch will be applied. However, such non-stick materials form only a thin film on the inner liner. It is desirable to remove this thin film of non-stick materials without piercing through the relatively thin, inner liner. By way of example, removal of 0.3 mm or less of material may be specified in some applications. Further, it is desirable that such surface preparation is limited to the specific surface area where the patch will be applied and that a uniform amount of material is removed over this surface area.

One technique that has been employed for removal of the non-stick materials is to manually grind or buff the surface of the inner-liner. More specifically, an operator marks the desired location for the patch on the inner surface of the tire using, for example, a template. An ink or marking fluid is applied to mark the desired surface. The operator then uses a hand-held grinder to manually buff the surface. Skill is required to restrict the grinder to only the desired surface marked with the template. For example, the torque applied to the operator upon contact between the grinder and the tire surface will cause the grinder to rapidly move along the tire surface and then potentially outside the desired surface area if not restricted by the operator. Furthermore, the operator must control the amount of pressure and time spent at a given location in order to remove material uniformly throughout the desired surface area. In addition, the grinding process creates dust or particles that can cover the marks created by the template and otherwise increase the complexity of this manual operation.

Accordingly, an apparatus that assists an operator with removal of non-stick materials from the inner surface of a tire is desirable. More particularly, an apparatus that allows the operator to more precisely control the surface area contacted by the grinder as well as the depth of material removed within such surface area is needed. Such a device that also is adjustable for various tire sizes and that also provides for removal of dust or other particulates during grinding is also desirable.

SUMMARY OF THE INVENTION

Objects and advantages of the invention will be set forth in part in the following description, or may be obvious from the description, or may be learned through practice of the invention.

The present invention provides an apparatus for use in preparing a tire for the application of a patch. The present invention facilitates a more controlled and uniform removal of non-stick material from the surface of a tire where the patch will be applied. The apparatus disclosed here allows for the elimination of marking templates and marking paints or inks that require time to apply and can contaminate the surface being prepared. Using the disclosure contained herein, one of ordinary skill in the art will appreciate that the invention exists in multiple embodiments as set forth herein and as fall within the scope of the claims that follow. A summary of the invention and certain exemplary embodiments is now set forth.

In one exemplary embodiment of the present invention, an apparatus for preparing a tire for patch application is provided. This apparatus includes a table having a support surface configured for receipt of the tire. In a preferred embodiment, the support surface can be tilted relative to the table so as to facilitate loading the tire onto the support surface. A tool post extends from the support surface and is configured for selectively rotating within a plane that is substantially perpendicular to the support surface. The tool post defines an attachment end. A shaft is configured for complementary connection to the attachment end of the tool post. The shaft is constructed with the tool post so that the shaft can selectively rotate about an axis that is substantially perpendicular to the support surface of the table. A tool, preferably including a grinding wheel or grinding mechanism for removing material from the inner surface of the tire, is connected to the shaft and is configured for extending to the tire and rotating along with the shaft. A vacuum may be provided to remove particulates created from the grinding operation. In a preferred embodiment, a gauge is provided that is connected to the tool post and is configured for providing a visual indication or measurement of the relative position of the tool. A first and second stop extend from the support surface of the table. The stops are positioned so as to limit the selective rotation of the shaft and the tool along the axis that is substantially perpendicular to the support surface of the table. While the stops can be permanently positioned, in a preferred embodiment the distance between the stops is selectively adjustable.

In another exemplary embodiment of the present invention, an apparatus for preparing an inner surface of a tire for the application of a patch is provided. This exemplary embodiment includes a frame that is connected to a support surface for supporting the tire. The support surface is configured for selective rotation between a substantially horizontal position and an angled position. A tool post projects from the support surface and is configured for selective rotation within a plane substantially perpendicular to the support surface. A tool is provided, such as a grinding wheel, and is supported by the tool post. The tool is supported so that it extends into the tire such that the selective rotation of the tool post within a plane substantially perpendicular to the support surface changes the radial position of the tool relative to the inner surface of the tire. The tool is also configured for rotating about the tool post along the circumferential direction of the tire. A pair of tool stops project from the support surface and are positioned along the support surface so as to limit the movement of the tool along the circumferential direction relative to the inner surface of the tire.

In yet another exemplary embodiment of the present invention, an apparatus for preparing a tire for the application of a patch is provided. With the tire defining both a radial and a circumferential direction, the apparatus includes the following: A support table is provided that is configured for receipt of the tire. A mast extends from the support table and has at least a first end. The mast is configured so that this first end is selectively movable along the radial direction of the tire. A tool is removably supported along the first end of the mast and is configured for rotating about the mast along the circumferential direction of the tire.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in this specification, which makes references to the appended figures, in which.

Figure 1:
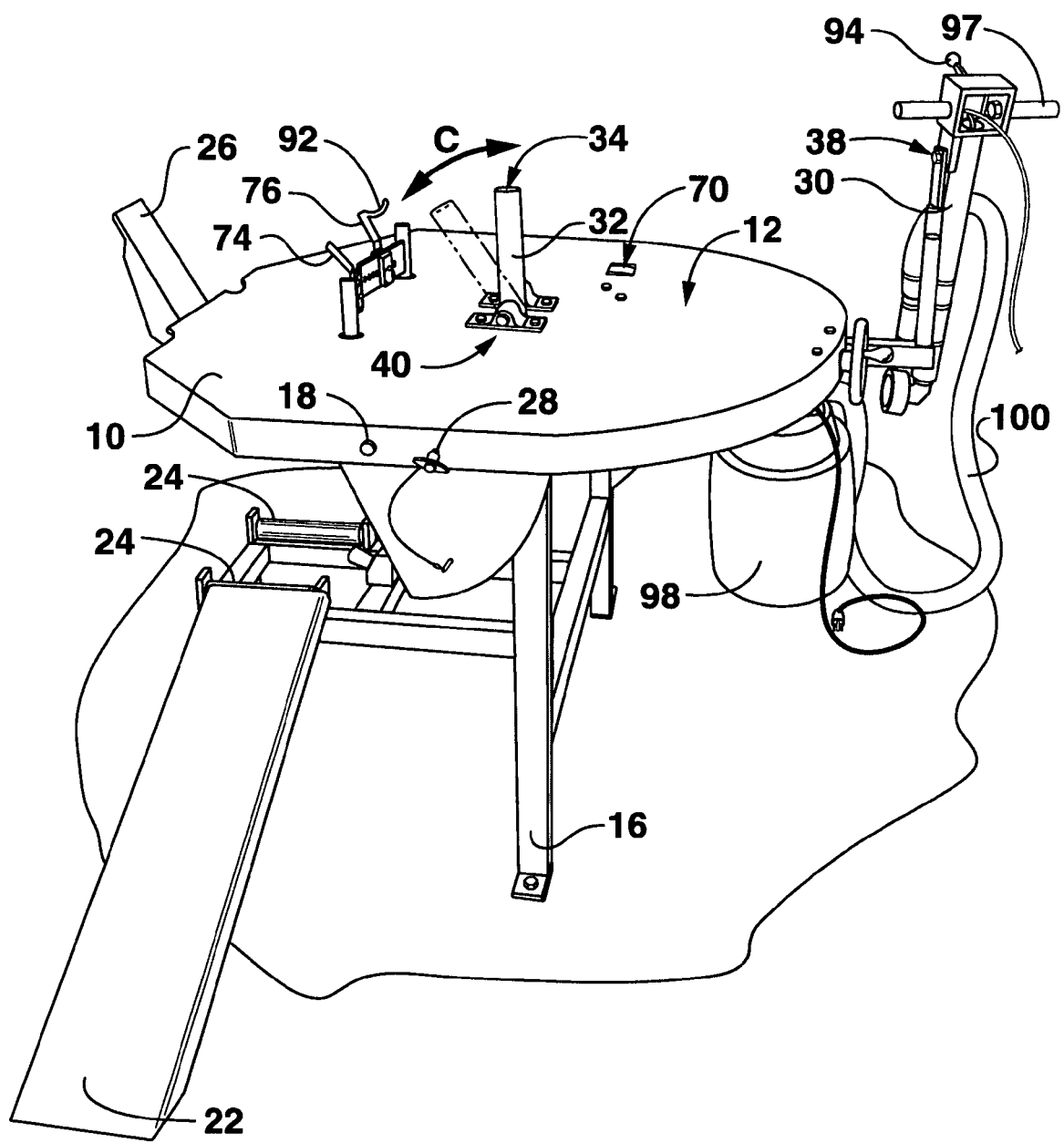
FIG. 1 is perspective view of an exemplary embodiment of the present invention. Movement of the tool arm support for this embodiment is also illustrated.

Repeat use of reference characters in the present specification and drawings is intended to represent same or analogous features or elements of the invention.

DETAILED DESCRIPTION OF THE PREFERRED EMBODIMENTS

Reference will now be made in detail to embodiments of the present invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

Figure 2:
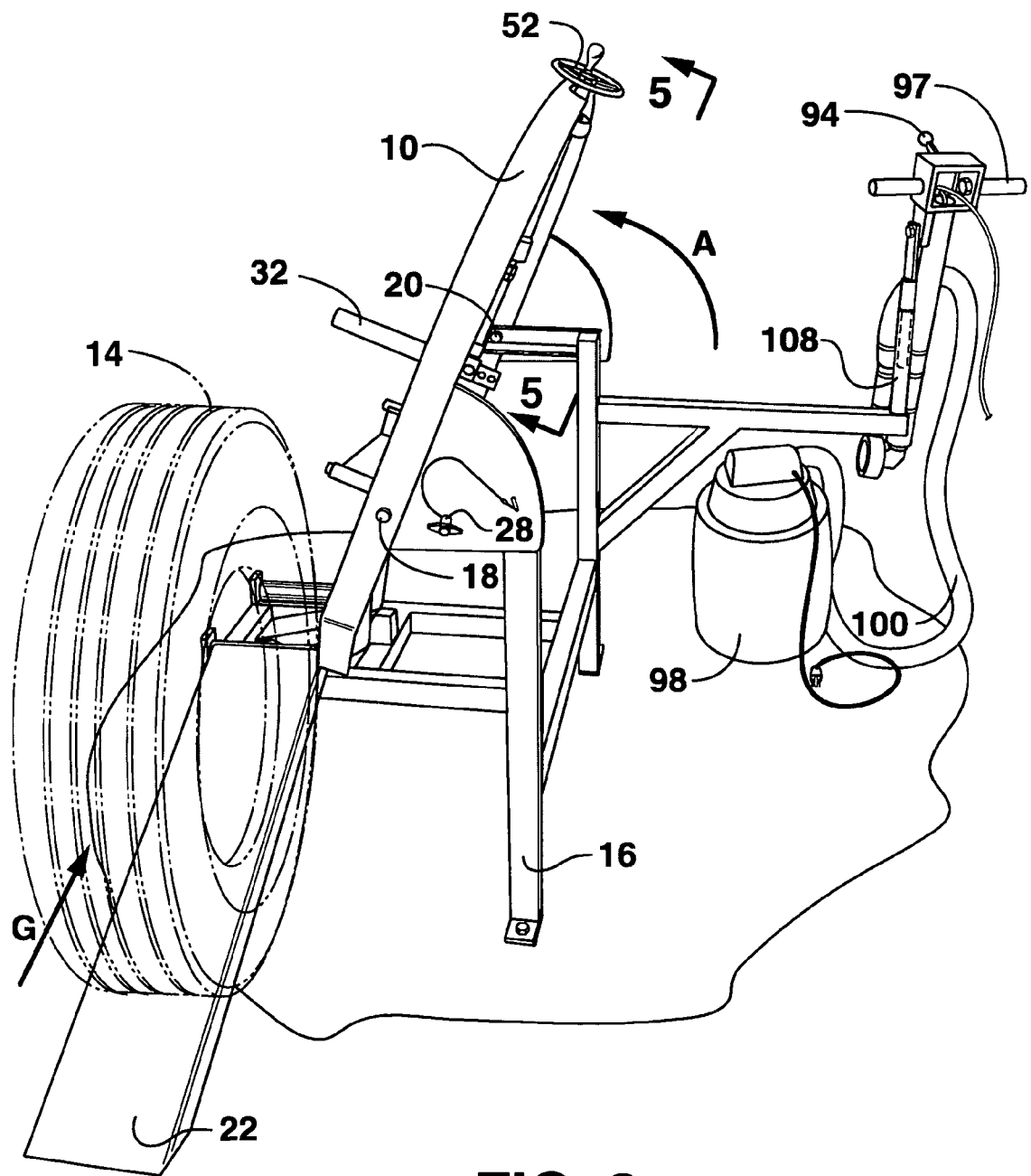
FIG. 2 is another perspective view of the exemplary embodiment of FIG. 1. Rotation of the table and loading of the tire for this embodiment is also illustrated.
Figure 3:
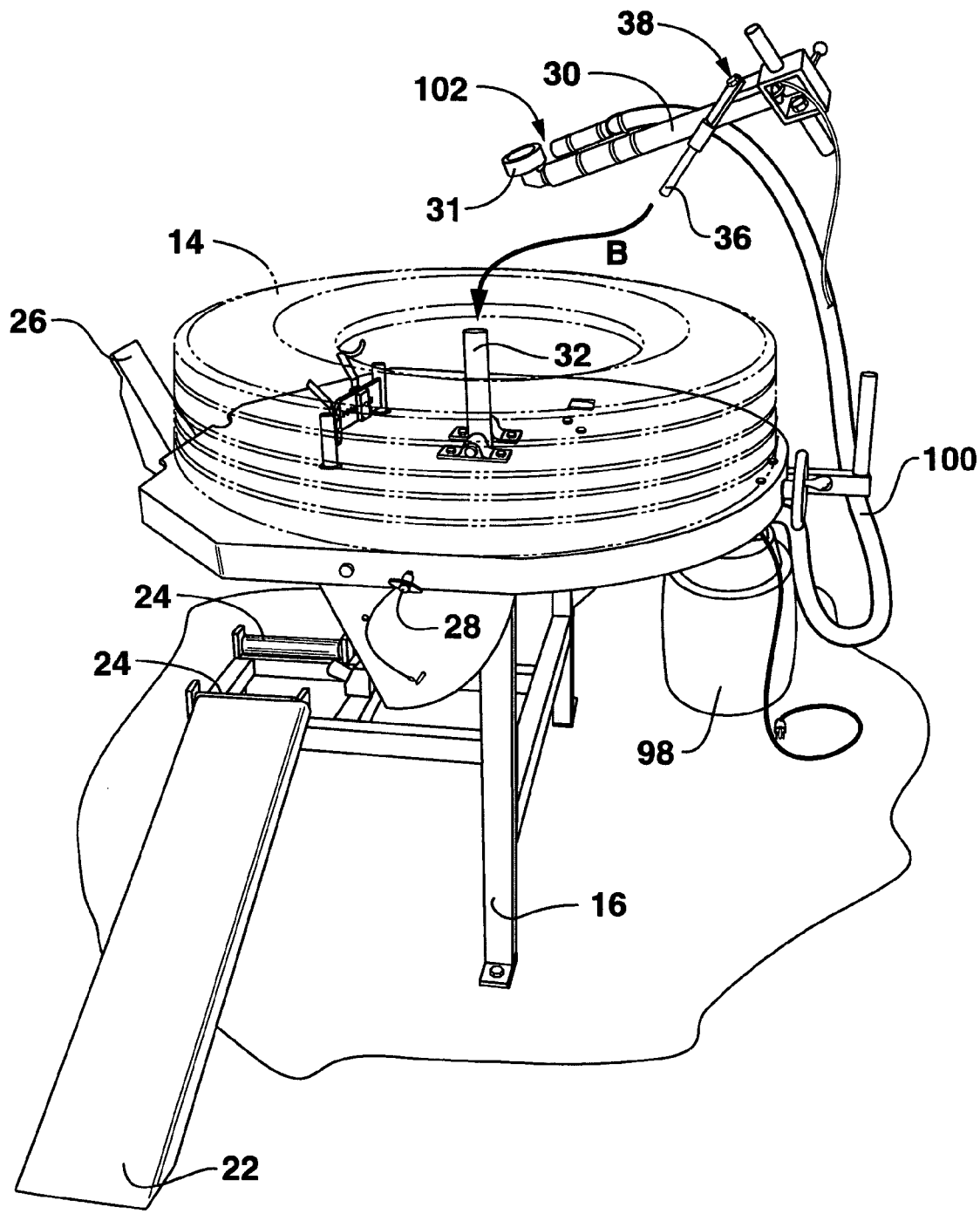
FIG. 3 is another perspective view of the exemplary embodiment of FIG. 1. Rotation of the table and placement of a grinding tool for this embodiment is also illustrated.

FIGS. 1, 2 and 3 illustrate perspective views of an exemplary embodiment of the present invention. As shown, support table 10 provides a flat surface 12 for supporting a tire 14 during buffing or grinding operations. Table 10 is pivotally supported by frame 16 at pivot points 18 and 20. As indicated by arrow A in FIG. 2, such allows table 10 to be rotated between the horizontal position shown in FIGS. 1 and 3 and the angled position shown in FIG. 2. Accordingly, tire 14 can be rolled up ramp 22 and onto a pair of rollers 24, which facilitate rotating tire 14 until the area desired for buffing is in the proper position on table 10. Once properly positioned, table 10 can be rotated into the horizontal position with tire 10 as shown in FIG. 3. Along with weight of tire 10 against surface 12, tire bracket 26 helps to ensure that tire 10 does not slide off as table 10 is being rotated. Releasable pin 28 is used to lock table 10 in either the horizontal or angled positions shown in FIG. 1 and FIG. 2 respectively.

Figure 4:
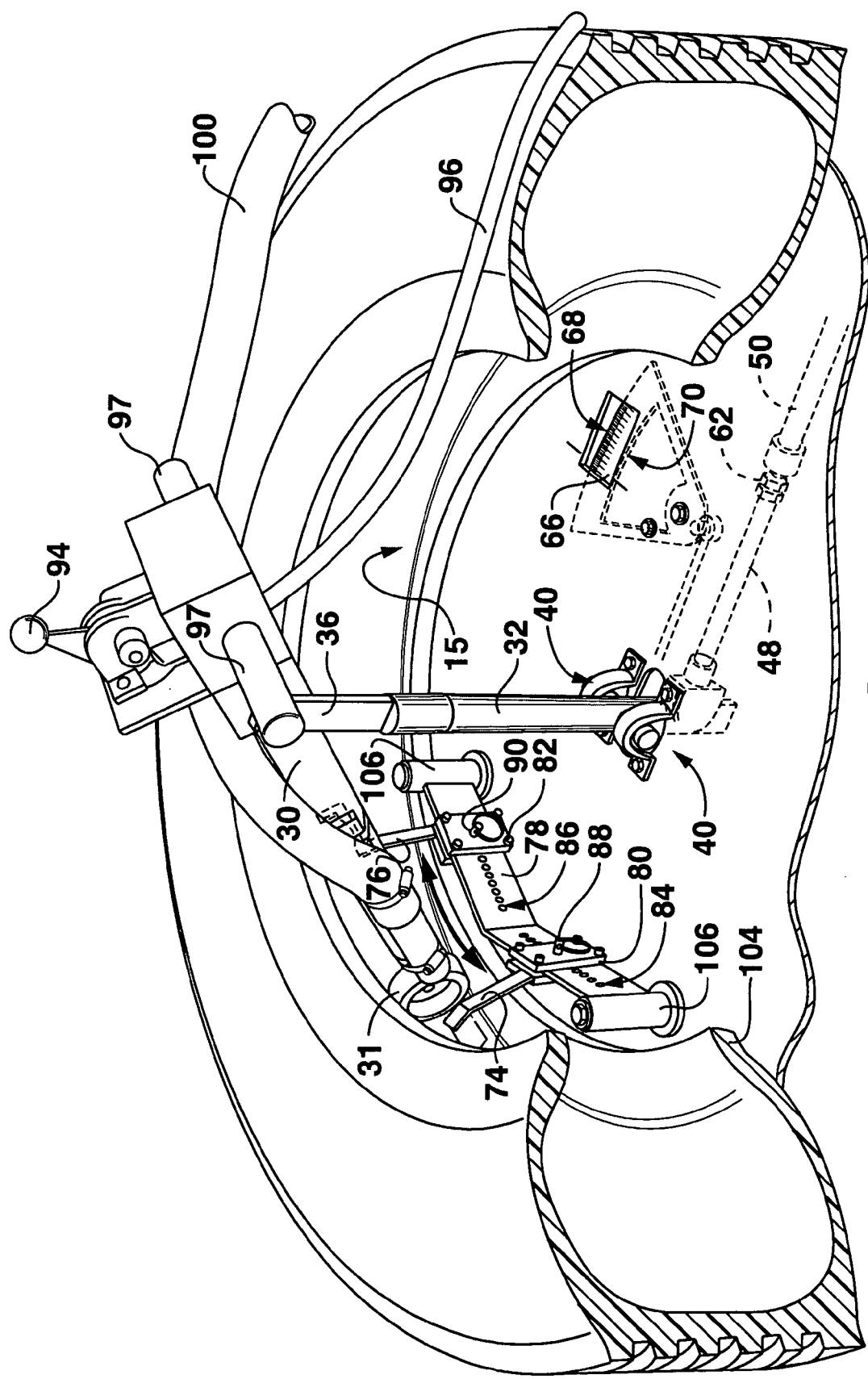
FIG. 4 is a partial perspective view of the exemplary embodiment of FIG. 1. Circumferential movement of the grinding tool for this embodiment is illustrated.

As illustrated by arrow B in FIG. 3, with tire 14 horizontally positioned on table 10, tool 30 is now positioned on tool arm support or mast 32 as grinding wheel 31 is positioned within tire 14 and rests upon inner tire surface 15 (shown in FIG. 4). An aperture 34 (FIG. 1) located at the end of mast 32 is configured for complementary receipt of shaft 36, which in turn is pivotally connected to tool 30 at pivot point 38. By an adjustment mechanism 42 to be described below, mast 32 can be selectively pivoted in a single plane (a plane that is substantially perpendicular to surface 12) about pivot points 40 as illustrated by arrow C in FIG. 1. As such, the pivoting (arrow C) of mast 32 at pivot points 40 and the resulting pivotal movement of tool 30 at pivot point 38 allows grinding wheel 31 to be selectively positioned in the radial direction along inner tire surface 15. Also, tool 30 can rotate around mast 32 as shaft 36 is rotatable within aperture 34. As such, grinding wheel 31 can also be selectively positioned along the circumferential direction of tire 14.

Figure 5:
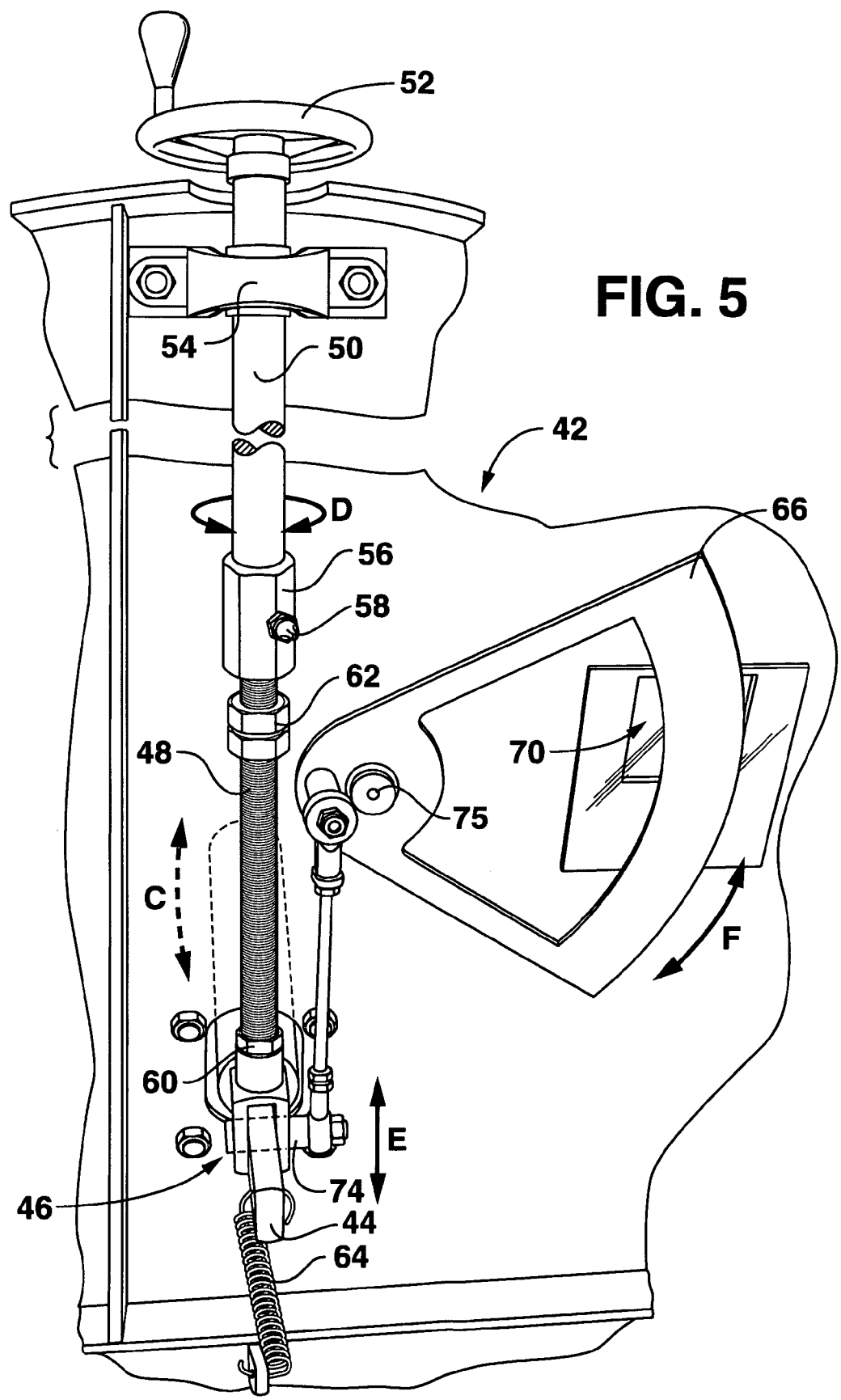
FIG. 5 is a partial perspective view of the exemplary embodiment of FIG. 1. Adjustment for different tire sizes for this embodiment is illustrated.

The precise position of grinding wheel 31 along inner tire surface 15 is controlled by an adjustment mechanism 42 that will now be described with reference to FIG. 5. The bottom end 44 of mast 32 is pivotally connected at pivot point 46 to threaded shaft 48. In turn, threaded shaft 48 is coupled to drive shaft 50 having handwheel 52. Shaft 50 is rotatably attached to table 10 by bearings 54. Accordingly, as an operator rotates handwheel 52, drive shaft 50 rotates as indicated by arrow D. This action also rotates coupler 56, which is locked into a position onto drive shaft 50 by locking bolt 58. Coupler 56 is threaded for complementary receipt of threaded shaft 48. Threaded shaft 48 is locked into position relative to the bottom end 44 of mast 32 by locking nut 60. Thus, as drive shaft 50 rotates, threaded shaft 48 moves in or out of coupler 56 depending on the direction of rotation. Also, the bottom end 44 of mast 32 is then moved as shown by arrow E, causing mast 32 to move as shown by arrow C (FIG. 1), and consequently the radial position of grinding wheel 31 along inner tire surface 15 is determined depending on the direction and amount by which handwheel 52 is rotated.

A pair of nuts 62 on threaded shaft 48 allows one to set the maximum amount by which shaft 48 may be screwed into coupler 56. Spring 64 provides a constant force to bottom end 44 so as to remove any variance in adjustment mechanism 42 and to provide for repeatable positioning.

An adjustment gauge 66 allows for precision in determining where grinding wheel 31 will be positioned along the inner surface 15 to tire 14 and the amount of subsequent movement. More specifically, gauge 66 allows for the location at which grinding wheel 31 will be placed on surface 15 to be specified for a given size or model of tire. Such allows, for example, a manufacturer to specify the radial position and radial width of the area of inner surface 15 of tire 14 that will be prepared for patch application.

Gauge 66 includes a series of marks 68 that can be read by an operator through opening 70 created within the surface 12 of table 10. As shown in FIG. 5, linking arm 72 pivotally connects gauge 66 to a pin 74 at the bottom end 44 of mast 32. As bottom end 44 is moved by turning hand wheel 52 as previously described, gauge 66 is rotated about pivot point 75 (arrow F) thereby providing the operator with a means of measuring the position of gauge 66 and, therefore, a relative measurement of where grinding wheel 31 will contact inner surface 15.

Referring now to FIGS. 1 and 4, control for the movement of grinding wheel 31 in a circumferential direction along the inner surface of the tire will now be described. Table 10 supports a left and right stop, 74 and 76, which are slidably mounted on an angled rail 78 using brackets 80 and 82. Angled rail 78 includes two sets of apertures 84 and 86. Using pins 88 and 90, the position of each stop 74 and 76 along angled rail 78 can be fixed. By varying the width between stops 74 and 76, the length (along the circumferential direction of tire 14) of the surface area contacted by grinding wheel 31 can be predetermined. Thus, the circumferential width of the area prepared for application of the patch can be specified by designating the positions of stops 74 and 76. Stop 76 also includes a yoke 92 (FIG. 1) on which grinding arm 30 can rest when not in use. Grinding arm 108 can also be stored on tool rest 108 (FIG. 2).

As shown in FIGS. 2 and 4 for example, grinding arm 30 includes a control switch 94 for activating the rotation of grinding wheel 31. Control switch 94 can also be used to regulate the speed of rotation as well. The rotation of grinding wheel 31 is pneumatically powered with air line 96 providing an air supply. Although this particular embodiment is pneumatic, it should be understood that the present invention includes other means of powering grinding wheel 31 such as, for example, electric systems. Tool 30 also includes handles 97 for moving grinding wheel 31 between stops 74 and 76 as will be described.

To remove dust or other particulars generated from the grinding process, a vacuum 98 is provided. A vacuum hose 100 is attached to tool 30 and to vacuum 98. The end 102 (FIG. 3) of hose 100 is positioned near grinding wheel 31 to facilitate removal of the undesired matter during operation.

Accordingly, referring now to all figures, in operation tire 14 is rolled up ramp 22 (FIG. 2, arrow G) and onto the rollers 24 carried by frame 16. Table 10 is in the angled position shown in FIG. 2 at this point in the operation. Tire 14 is then rotated until the desired position on tire 14 for application of a patch is located adjacent to stops 74 and 76. With the help of tire support 26, table 10 is now rotated into a horizontal position and locked into place using releasable pin 28. Tire bead 104 is pulled up against posts 106. If necessary, a degreaser or other solvent is applied to the inner surface 15 of tire 14.

Knowing the circumferential length of the patch to be applied or using an empirically created chart, the operator positions stops 74 and 76 along rail 78 using pins 88 and 90 and apertures 84 and 86. Tool 30 is now positioned onto mast 32 by inserting shaft 36 into aperture 34. Initially, tool 30 is placed upon yoke 92.

Again, either knowing the radial width and position of the patch to be applied or by following a previously provided chart, the operator rotates hand wheel 52 to provide the proper radial position of grinding wheel 31 along inner-tire surface 15. More specifically, using gauge 66 the operator can fix the desired position of grinding wheel 31 for the particular size or model of tire 14 being prepared for a particular patch size.

After starting vacuum 98, the operator now removes tool 30 off yoke 92 and positions it against stop 76 using handles 97. Grinding wheel 31 is suspended above, but not in contact with, inner tire surface 15. The rotation of grinding wheel 31 is now activated using control switch 94. It should be noted that grinding wheel 31 is oriented such that during its rotation upon surface 15, the torque applied to tool 30 does not urge tool 30 along the circumferential direction of tire 14. Instead, rotation of wheel 31 causes a torque to be applied substantially within the same plane as mast 32. Thus, once the operator lowers the grinding wheel 31 onto the inner-surface 15 of tire 14 to begin grinding, tool 30 does not attempt to move or run in the circumferential direction along surface 15 of tire 14. This means tool 30 can be more easily positioned by the operator. Also, because mast 32 is rigid (as compared to manual support by an operator) skipping or hopping of wheel 31 is minimized or eliminated. Using handles 97, once wheel 31 is lowered onto surface 15, the operator then moves tool 30 from right stop 76 to left stop 74 and then back again. An appropriate number of passes are used until the desired thickness of material is removed from the inner surface 15 of tire 14. This may be determined visually or from a chart previously prepared. The amount of material removed in a single pass can be determined in testing and will depend upon factors such as the texture of grinding wheel 31, the weight of tool 30, and the speed of rotation of wheel 31. It is important to note that the operator is not required to press down upon grinding wheel 31 or tool 30. Instead, the weight of tool 30 is used to supply an appropriate and consistent amount of grinding pressure.

Upon removing the desired amount of material, the operator returns tool 30 to yoke 92. Using hand wheel 52, mast 32 is tilted so as to change the radial position of grinding wheel 31 along inner tire surface 15. As previously described, gauge 66 can be used to precisely locate wheel 31. Once positioned, the operator again lifts tool 30 from yoke 92 and lowers grinding wheel 31 to surface 15 while positioning tool 30 against right step 76. As previously described, the operator then moves grinding wheel 31 circumferentially between stops 76 and 74 for the desired number of passes so that an appropriate amount of material is removed for patch application. By repositioning grinding wheel 31 as described, material is now being removed from the inner surface of the tire at a position that is radially adjacent to where material was removed before the grinding wheel 31 was repositioned. As such, the radial width of the area treated by the grinding wheel 31 is increased by this repositioning. Mast 32 can then be repositioned again in this manner and the process repeated until the area being treated by grinding wheel 31 has obtained the desired width along the radial direction. As already described, the length along the circumferential direction of the inner surface area 15 that is treated by grinding wheel 31 is fixed by the position of stops 74 and 76.

By using this exemplary embodiment as described, the size of the area being ground for patch application is more precisely controlled because movement of grinding wheel 31 is restricted. Furthermore, relying on the consistent weight of the tool rather than a totally free-hand operation allows for the removal of a more uniform amount of material from the inner-surface 15, which also results in a smoother surface. The operator cannot vary the force applied to surface 15 by pulling up on handles 97 because this will simply cause shaft 36 to separate from mast 32. Conversely, the operator is unlikely to decrease the force of grinding wheel 31 on surface 15 because pivot point 38 is located relatively close to handles 97 and a significant (and thus intentional) force must be applied to the handles 97 to raise grinding wheel 31. Also, the use of a template and marking inks is eliminated, thereby reducing the risk of contamination with these materials. Finally, vacuum 98 helps to remove matter from the grinding process that may obstruct the operator's view and also helps to keep the ground portion of the inner tire surface clean for application of the patch.

It should be appreciated by those skilled in the art that modifications and variations can be made to the apparatus as described herein, without departing from the scope and spirit of the claims. It is intended that the invention include such modifications and variations as come within the scope of the appended claims and their equivalents. By way of example only, it should be understood that the invention could be used with a variety of other tools 30 having attachments other than grinding wheel 31.

What is claimed is:

1. An apparatus for preparing a tire for patch application, comprising:
    a table having a support surface configured for receipt of the tire;
    a tool post extending from the support surface, said tool post configured for selectively rotating within a plane substantially perpendicular to the support surface, said tool post defining an attachment end;
    a shaft configured for complementary connection to the attachment end of said tool post and configured such that said shaft can selectively rotate about an axis that is substantially perpendicular to the support surface of said table;
    a tool connected to said shaft and configured for extending to the tire and rotating with said shaft; and
    a first and second stop extending from the support surface of said table, said first and second stops being positioned so as to limit the selective rotation of said shaft and said tool along the axis substantially perpendicular to the support surface of said table.

2. An apparatus for preparing a tire for patch application as in claim 1, wherein the distance between said first and second stops is selectively adjustable.

3. An apparatus for preparing a tire for patch application as in claim 1, further comprising a gauge in mechanical communication with said tool post and configured for indicating the relative position of said tool.

4. An apparatus for preparing a tire for patch application as in claim 1, wherein said tool includes a grinding wheel for removing material from an inner surface of the tire.

5. An apparatus for preparing a tire for patch application as in claim 4, further comprising a vacuum connected to said tool and configured to remove particulates created by operation of said tool.

6. An apparatus for preparing a tire for patch application as in claim 1, wherein the support surface of said table can be tilted relative to said table to facilitate loading the tire onto the support surface.

7. An apparatus for preparing a tire for patch application as in claim 6, wherein said table includes a pair of rollers for rotating the tire prior to resting the tire on the support surface of said table.

8. An apparatus for preparing an inner surface of a tire for the application of a patch, comprising:
    a frame;
    a support surface for supporting the tire, said surface connected to said frame and configured for selective rotation between a substantially horizontal position and an angled position;
    a tool post projecting from said support surface, said tool post configured for selective rotation within a plane substantially perpendicular to said support surface;
    a tool supported by said post and extending into the tire such that the selective rotation of said tool post within a plane substantially perpendicular to said support surface changes the radial position of said tool relative to the inner surface of the tire, said tool also being configured for rotating about said tool post along the circumferential direction of the tire; and
    a pair of tool stops projecting from said support surface, said tool stops being positioned along said support surface so as to limit the movement along the circumferential direction of said tool relative to the inner surface of the tire.

9. An apparatus for preparing an inner surface of a tire for the application of a patch as in claim 8, wherein said pair of tool stops are mounted upon a rail defining a plurality of apertures that are configured for allowing the space between said pair of tool stops to be adjusted so as to limit the amount by which said tool may rotate along the circumferential direction of the tire.

10. An apparatus for preparing an inner surface of a tire for the application of a patch as in claim 9, further comprising a yoke located upon at least one of said tool stops, said yoke being configured for holding said tool.

11. An apparatus for preparing an inner surface of a tire for the application of a patch as in claim 8, further comprising a gauge configured with said tool post so as to indicate the relative position of said tool along the inner surface of the tire.

12. An apparatus for preparing an inner surface of a tire for the application of a patch as in claim 11, where said support surface defines an aperture through which said gauge may be viewed.

13. An apparatus for preparing an inner surface of a tire for the application of a patch as in claim 8, further comprising at least two rollers attached to said frame and positioned so as to allow the tire to be rotated such that the inner surface of the tire may be properly positioned along said support surface.

14. An apparatus for preparing a tire for the application of a patch, the tire defining both a radial and a circumferential direction, the apparatus comprising:
    a support table configured for receipt of the tire;
    a mast extending from said support table and having a first end, said mast pivotally attached to said support table such that said mast is selectively rotatable within a plane substantially perpendicular to said support table; said mast configured so that the first end is selectively movable along the radial direction of the tire;
    a tool that is removably supported along the first end of said mast and configured for rotating about said mast along the circumferential direction of the tire.

15. An apparatus for preparing a tire for the application of a patch as in claim 14, further comprising a measuring device connected to said mast and configured for visually indicating the relative position of said tool relative to the tire along the radial direction of the tire.

16. An apparatus for preparing a tire for the application of a patch as in claim 14, further comprising:
   a shaft having a first end and a second end, wherein said first end is connected to said tool, and
wherein said mast defines an aperture at the first end of said mast, said aperture configured for receipt of the second end of said shaft.

17. An apparatus for preparing a tire for the application of a patch as in claim 14, wherein said tool comprises a grinding wheel.

18. An apparatus for preparing a tire for the application of a patch as in claim 17, further comprising a vacuum configured with said tool so as to remove particulates created by the operation of said grinding wheel.

19. An apparatus for preparing a tire for the application of a patch as in claim 14, wherein said support table includes at least two rollers upon which the tire may be placed and rotated so as to allow for proper positioning of the tire upon said support table.

20. An apparatus for preparing a tire for the application of a patch as in claim as in claim 14, further comprising:
   first and second tool stops, and
   wherein said first and second tools stops are selectively positionable upon said support table.

* * * * *